(12) United States Patent
Vincent et al.

(10) Patent No.: US 6,402,455 B1
(45) Date of Patent: Jun. 11, 2002

(54) SEPARATOR SHEET HANDLER FOR A PALLETIZER

(75) Inventors: Patris E. Vincent, Madison; Brian E. Busse, Randolph, both of WI (US)

(73) Assignee: Arrowhead Systems LLC, Randolph, WI (US)

( * ) Notice: Subject to any disclaimer, the term of this patent is extended or adjusted under 35 U.S.C. 154(b) by 0 days.

(21) Appl. No.: 09/180,168

(22) PCT Filed: May 2, 1997

(86) PCT No.: PCT/US97/07520

§ 371 (c)(1),
(2), (4) Date: Jan. 19, 1999

(87) PCT Pub. No.: WO97/42114

PCT Pub. Date: Nov. 13, 1997

Related U.S. Application Data (60) Provisional application No. 60/016,853, filed on May 3, 1996, provisional application No. 60/017,014, filed on May 3, 1996, and provisional application No. 60/016,845, filed on May 3, 1996.

(51) Int. Cl.[7] ............................................. B65G 57/10
(52) U.S. Cl. .............................. 414/789.5; 414/789.9; 414/793; 414/799; 414/794.6; 271/91
(58) Field of Search .............................. 414/799, 791.7, 414/927, 789.5, 789.9, 794.6, 793; 271/91

(56) References Cited

U.S. PATENT DOCUMENTS

| | | | | |
|---|---|---|---|---|
| 2,941,799 A | * | 6/1960 | Reincke ........................ | 271/91 |
| 3,436,895 A | * | 4/1969 | Pearne et al. ............ | 414/799 X |
| 3,522,890 A | | 8/1970 | Birchall ................... | 414/789.5 |
| 3,643,822 A | | 2/1972 | Birchall ....................... | 414/799 |
| 3,645,410 A | * | 2/1972 | Powell ......................... | 414/799 |
| 3,809,388 A | | 5/1974 | Downing ..................... | 271/20 |
| 3,897,877 A | | 8/1975 | Vandermeer et al. .......... | 214/6 |
| 3,934,713 A | * | 1/1976 | Vander Meer et al. ...... | 414/799 |
| 3,994,407 A | * | 11/1976 | Von Gal, Jr. et al. ........ | 414/799 |
| 4,607,476 A | * | 8/1986 | Fulton, Jr. ................ | 414/789.5 |
| 4,759,673 A | | 7/1988 | Pearce et al. .................. | 414/42 |
| 4,978,275 A | * | 12/1990 | Reid et al. ........... | 414/789.5 X |
| 5,074,744 A | * | 12/1991 | Mastak ..................... | 414/791.7 |
| 5,083,763 A | | 1/1992 | Hartta ......................... | 271/91 |
| 5,181,707 A | | 1/1993 | Takei et al. .................... | 271/20 |
| 5,375,493 A | * | 12/1994 | Focke et al. ............. | 414/789.5 |
| 5,375,967 A | | 12/1994 | Rathert .................... | 414/789.5 |
| 5,433,426 A | | 7/1995 | Bond .......................... | 271/92 |
| 5,522,692 A | | 6/1996 | Simkowski .............. | 414/789.5 |
| 5,676,364 A | * | 10/1997 | Shiiki et al. .................. | 271/91 |
| 5,924,838 A | * | 7/1999 | Garvey et al. .............. | 414/799 |

\* cited by examiner

Primary Examiner—Joseph A. Fischetti
(74) Attorney, Agent, or Firm—Michael Best & Friedrich LLP (57) ABSTRACT

A palletizer assembly is comprised of a conveyor (14), a pattern-making apparatus (18) for arranging objects received from the conveyor into a pattern, a main hoist (26) for supporting a pallet in position to receive a layer of objects, a sweep apparatus (22) for moving a discrete number of objects from the pattern-making apparatus into a layer of objects on the pallet, and a separator sheet handler assembly (50) for delivering separator sheets to the main hoist for separating layers of objects on the pallet. The separator sheet handler assembly (50) includes a first stage handler (70) including a chute (86), for moving a single separator sheet into the chute. The separator sheet handle assembly (50) also includes a second stage handler (74) for moving the sheet from the chute (86) into position in the main hoist (26).

16 Claims, 11 Drawing Sheets

SEPARATOR SHEET HANDLER FOR A PALLETIZER

RELATED APPLICATIONS

This application claims the benefit under 35 U.S.C. §119 of co-pending U.S. Provisional Patent Application Serial Nos. 60/016,853; 60/017,014; and 60/016,845, all filed May 3, 1996.

BACKGROUND OF THE INVENTION

1. Technical Field

The invention relates to generally to material handling systems, and particularly to palletizer for arranging articles on a pallet.

2. Related Prior Art

A palletizer is operable to place objects into an organized pattern and place the objects onto a pallet. It is known to provide such palletizer with a container conveyor assembly, a pattern-making apparatus to organize the objects into a pattern, a pallet dispenser, a separator sheet dispenser and a main hoist for holding the pallet in a position to receive a layer of objects and to move the pallet and layers of objects so as to receive an additional layer of objects.

SUMMARY OF THE INVENTION

The invention provides a separator sheet handler assembly for use with a palletizer to place an individual sheet on the upper surface of a tier of objects to separate the tier of objects from the next tier of objects to be placed on top of the sheet. The separator sheet handler assembly is operable so that separator sheets are precisely placed in position on the upper surface of a tier of objects.

More particularly, the separator sheet handler assembly includes a two-stage handler: the first stage selects a single sheet from a stack of sheets and positions the sheet in a highly precise manner at a staging position; the second stage picks the sheet at the staging position and transports the sheet onto the tier of objects. The first stage separator sheet handler lifts a separator sheet from a stack of separator sheets, and includes apparatus for shearing the uppermost sheet away from the next upper sheet so that only a single sheet is drawn by the first stage handler to the staging position. The second stage handler moves in tandem with a sweep apparatus for moving objects onto a pallet. The second stage handler picks up the staged separator sheet and places the separator sheet under a transition surface or tilt plate provided by the sweep apparatus. This aspect of the separator sheet handler provides a means of capturing the separator sheet and preventing the sheet from moving away from the precise location in which the second stage separator sheet handler leaves the separator sheet.

Because the separator sheet is accurately positioned at the staging position, the second stage of the handler can quickly move the separator sheet over the tier of objects without having to reposition the sheet or provide locator surfaces adjacent the tier of objects for positioning the sheet. Another advantage of the invention is the provision of a separator sheet handler that does not require guards for preventing fly-away separator sheets from becoming fouled in other components of the palletizer. Also, the separator sheet handler assembly is a modular unit that can be used with existing palletizer, so that retrofitting existing palletizer and modular construction of palletizer with the separator sheet handler assembly is made possible.

Other features and advantages of the invention will become apparent to those skilled in the art upon review of the following detailed description, claims and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
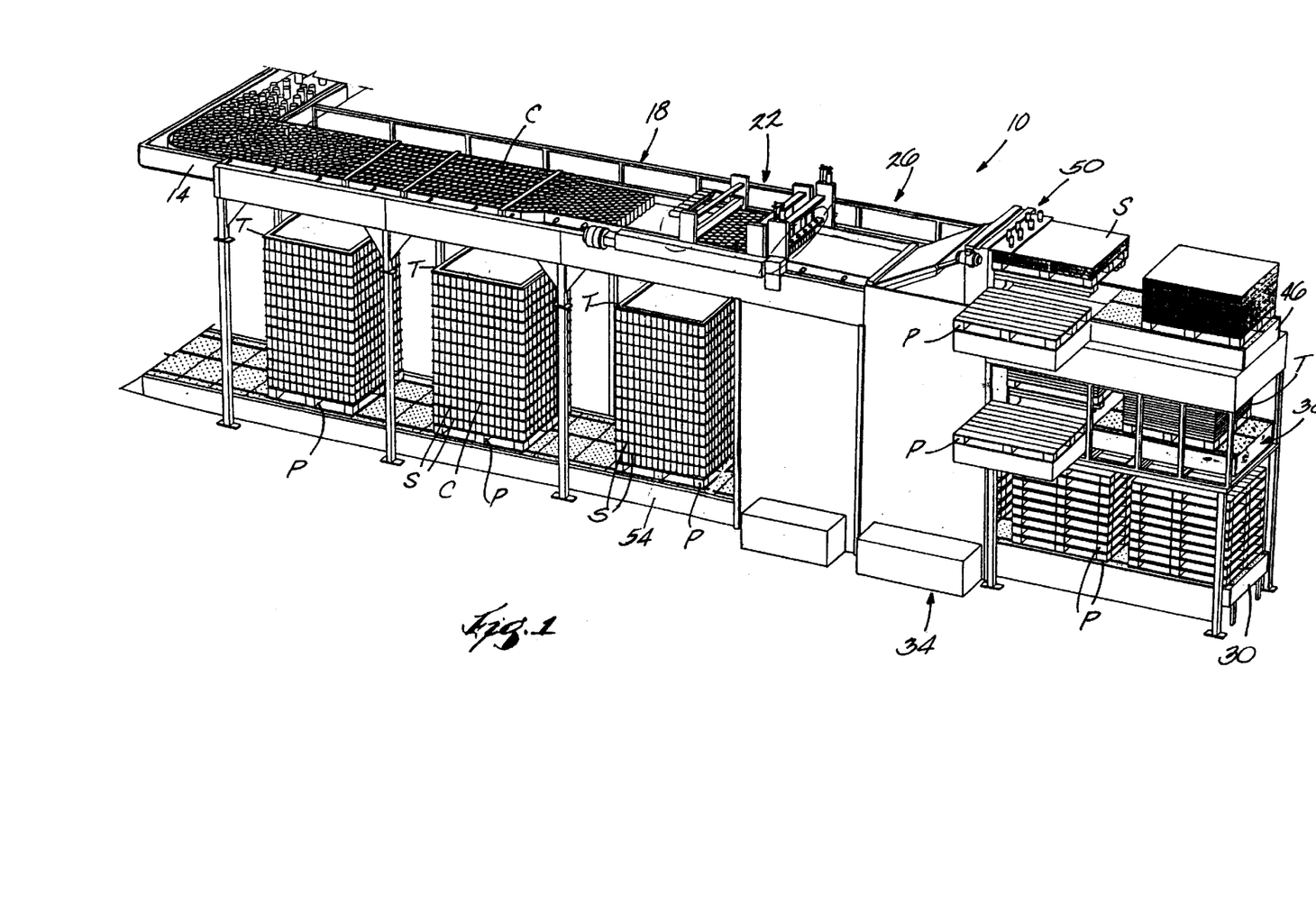
FIG. 1 is a perspective view of a palletizer assembly embodying the invention, with containers being palletized moving from left to right.

A palletizer assembly 10 embodying the invention is illustrated in the drawings. The palletizer 10 comprises (see FIG. 1) a conveyor assembly 14, a pattern-making apparatus 18 for arranging objects, such as containers, received from the conveyor 14 into a pattern, a sweep apparatus 22 for moving a discrete number of objects from the pattern-making apparatus 18 into a layer of objects on a pallet, and a main hoist 26 for supporting a pallet in position to receive a layer of objects from the sweep apparatus 22. The containers are denoted in the drawings generally by reference letter "C" and the pallets are denoted by the letter "P".

The pallets are delivered to the main hoist 26 by means of a pallet dispenser 30, and a pallet hoist 34 for receiving a stack of pallets from the pallet dispenser 30 and for lifting an individual pallet upwardly. The palletizer assembly 10 also includes a top frame dispenser 38, and a top frame handler assembly 42 for moving individual top frames from the top frame dispenser into the main hoist into a position on top of a completed stack of objects. The drawings denote top frames generally with reference letter "T". The sweep apparatus 22 and the top frame handler assembly 42 are further described in the following co-pending international patent applications, which are assigned to the assignee hereof and which are incorporated herein by reference: application Ser. No. 09/180,169, filed concurrently herewith and titled "Container Sweep Apparatus for a Palletizer"; and application Ser. No. 09/180,170, filed concurrently herewith and titled "Pallet and Top Frame Handler for a Palletizer and Method of Handling a Pallet and Top Frame in a Palletizer".

The palletizer assembly 10 also includes a separator sheet dispenser 46 and a separator sheet handler assembly 50 for delivering separator sheets to the main hoist 26 for separating layers of containers stacked on a pallet. The separator sheets are denoted in the drawings generally by reference letter "S". A complete stack conveyor 54 is located at the bottom of the main hoist 26 for receiving a completed stack of containers comprising a pallet supporting multiple layers of containers with separator sheets between and a top frame supported by the uppermost layer of containers.

Figure 2:
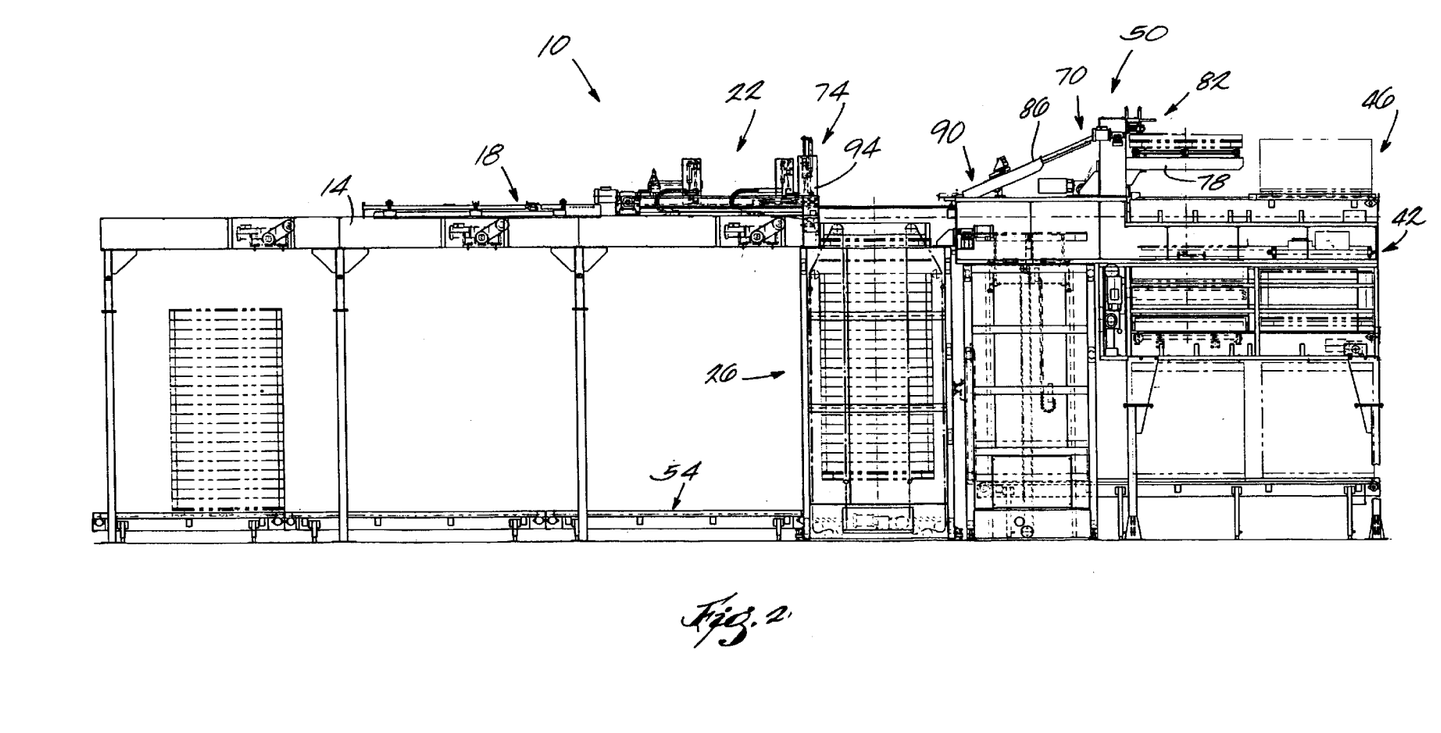
FIG. 2 is a side elevation view of the palletizer assembly.

More particularly, and with reference to FIG. 2, the separator sheet handler assembly 50 includes a first stage handler 70 and a second stage handler 74. The first stage separator sheet handler 70 includes a lift assembly 78 for moving a pallet supporting a stack of separator sheets upwardly, a first shuttle 82 for moving a single separator sheet from the stack into a chute 86, and an indexer 90 for precisely locating the leading edge of a sheet in the chute 86. The second stage separator sheet handler 74 includes a second shuttle 94 which is part of the sweep apparatus 22, which is described in detail below and which moves a sheet from the chute into position in the main hoist 26 and over a tier of containers supported by a pallet.

Figure 3:
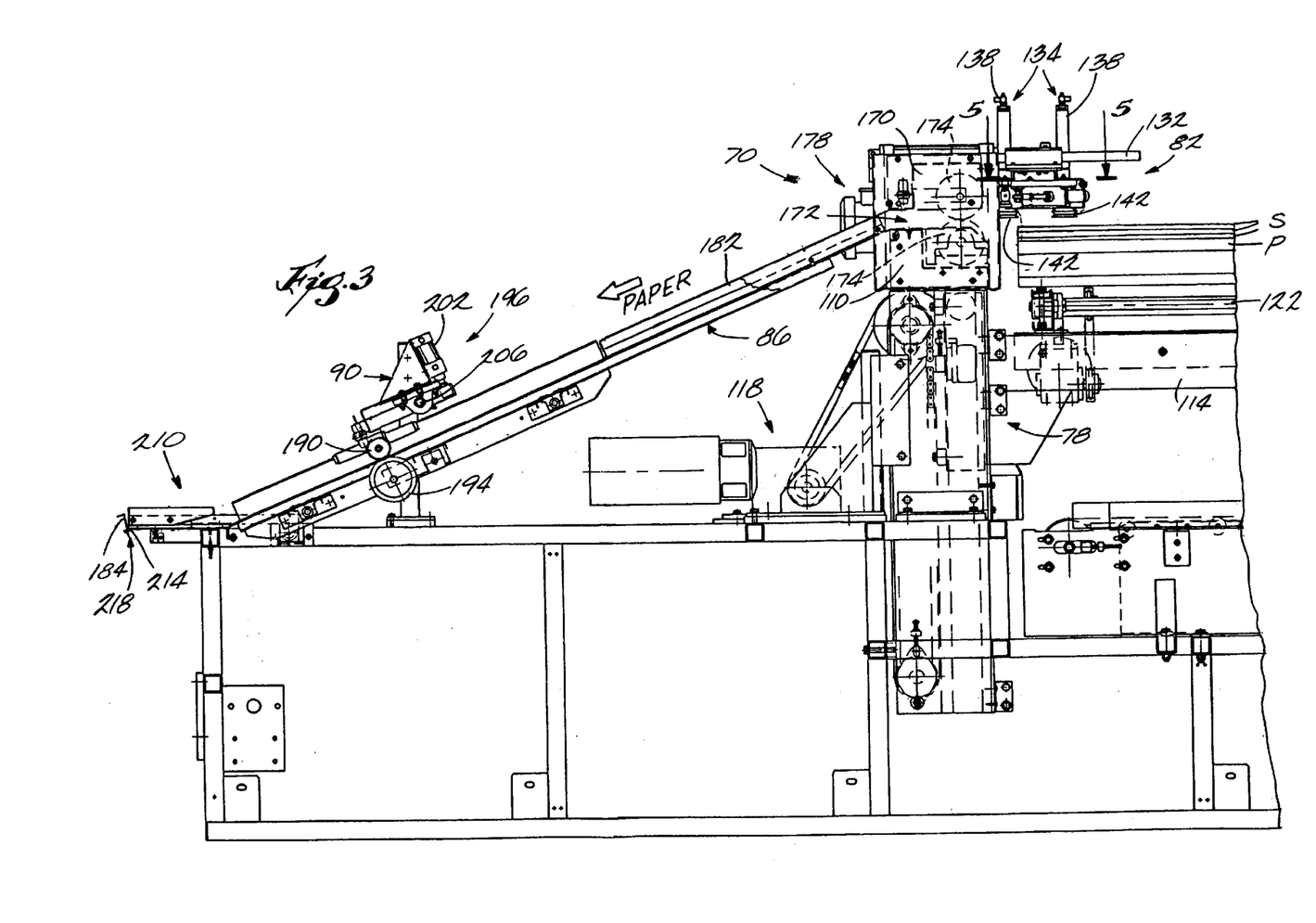
FIG. 3 is an enlarged side elevational view of a portion of the palletizer assembly.
Figure 4:
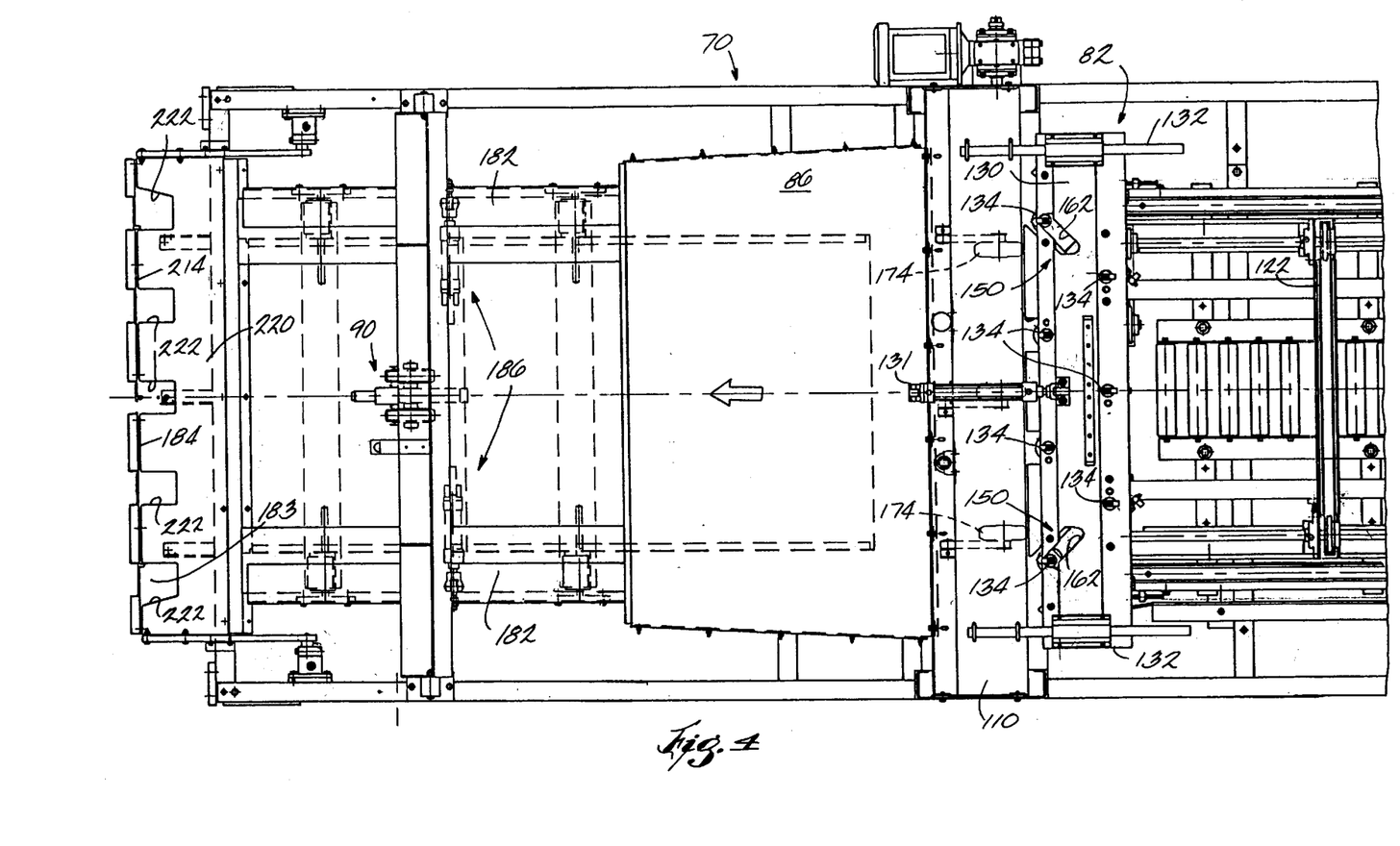
FIG. 4 is a top view of the portion shown in FIG. 3.

With reference to FIGS. 3 and 4, the lift assembly 78 includes a lift frame 110 which is located adjacent the separator sheet dispenser 46. The lift frame 110 supports a platform 114 that can be indexed upwardly and downwardly by a drive 118 to move the stack of separator sheets into position to be picked up by the first shuttle 82. The lift assembly 78 also includes a discharge conveyor 122 that receives an emptied pallet from the lift and shunts the pallet to one side of the lift platform 114 to make room for another pallet of separator sheets.

Figure 5:
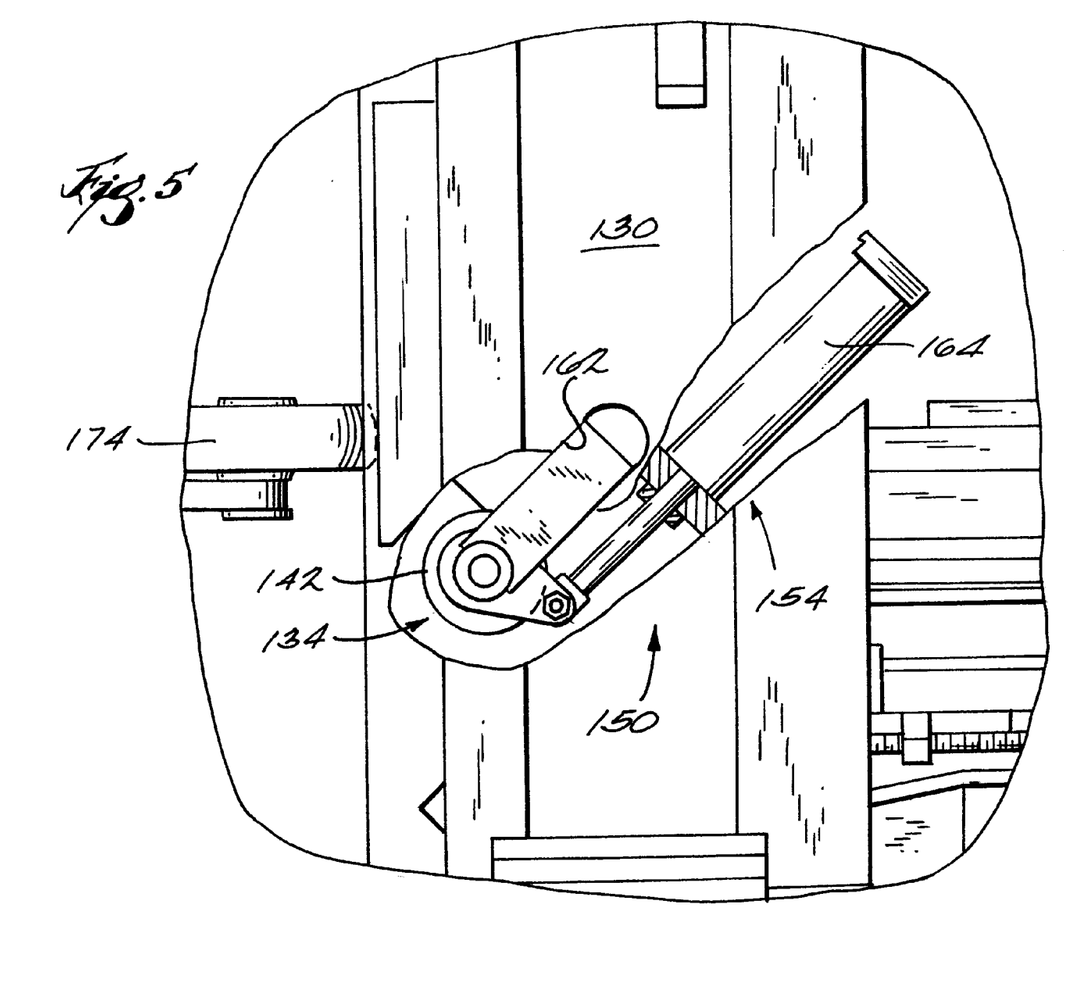
FIG. 5 is an enlarged view taken generally along line 5—5 in FIG. 3.

The first shuttle 82 is mounted on the lift frame 110 and indexes both horizontally and vertically to pick up a single sheet from the stack of sheets and to deliver the single sheet to the chute 86. More particularly, the first shuttle 82 includes a subframe 130 that extends across the width of the stack of separator sheets and that is reciprocated horizontally (left to right in FIG. 4) by action of a shuttle cylinder 131 along two supporting guides 132. The shuttle 82 also includes a plurality of suction assemblies 134 located at various positions across the width of the subframe 130. With particular reference to FIGS. 4 and 5, the shuttle 82 includes seven suction assemblies 134, a row of three assemblies 134 on the side of the subframe 130 toward the conveyor 122 and a row of four assemblies 134 on the side of the subframe 130 toward the chute 86. The assemblies 134 are located in alternating positions across the width of the subframe 130 so that the two end assemblies 134 in the row of four (i.e., located next to the ends of the subframe 130) are positioned to attach to the lead edge of a separator sheet and near a corner of the sheet.

Each suction assembly 134 includes a cylinder 138 (FIG. 3) and, at the lower end of the cylinder 138, a suction cup 142 that is selectively communicable to a vacuum or source of low pressure (not shown). The cylinders 138 are operable to raise and lower the respective suction cups 142 from a lower position wherein the cups 142 engage the uppermost separator sheet in a stack of sheets supported on the lift assembly 78, to a raised position wherein the sheet can be fed into the chute 86 in a manner discussed below.

The first stage handler 70 also includes (FIGS. 4 and 5) separating means 150 for assuring that the first shuttle 82 moves only a single sheet from the stack of separator sheets. While various constructions for the separating means 150 can be used, in the illustrated embodiment the separating means 150 includes a pair of bend-back actuators 154 that are operable to index the corners of the top separator sheet inwardly and in the direction away from the chute 86 (to the right in FIG. 5) in order to bend the sheet and to shear away the next lowest separator sheet. The suction assemblies 134 that are located at the outer ends of the subframe 130 extend through respective slots 162 in the subframe and are supported by the subframe 130 for reciprocating movement along the slots 162. Each actuator 154 includes a cylinder/piston assembly 164 operable to move the associated suction assembly 134 along its slot 162. As shown in FIG. 5, the slots 162 extend diagonally with respect to the guides 132, so that the corner assemblies 134 are drawn inwardly of the edges of the sheet as the cylinder/piston assemblies 164 are contracted. This moves the corners of the top sheet inwardly with the corner assemblies 134.

The first shuttle 82 operates by moving into an extended position over the stack of separator sheets with the suction assemblies 134 raised. When so positioned, the four suction assemblies 134 located closest to the chute 86 are slightly past the lead edge of the top separator sheet and above the sheet. The suction cups 142 are then lowered into contact with the sheet to be removed from the stack. The vacuum is applied through the suction cups 142 to the sheet, and the suction assemblies 134 retract upwardly. Subsequently, the bend-back actuators 154 index to bend back the corners of the top sheet held by the suction cups 142. With the other suction assemblies 134 holding the remainder of the top sheet stationary, this movement of the corners of the top sheet shears the top sheet away from any sheet below the top sheet that may have been inadvertently raised with the top sheet, so that the first shuttle 82 removes only a single sheet from the stack of separator sheets. After the bend-back actuators 154 are indexed back and forth, the subframe 130 is moved by the shuttle cylinder 131 along the guides 132 toward the chute 86.

The first stage handler 70 also includes a drive 170 for moving the separator sheet held by the shuttle 82 into the chute 86. As best shown in FIGS. 3 and 4, the drive 170 includes two pairs 172 of driven rollers 174, the rollers 174 of each pair being closely spaced together and engaging the upper and lower surfaces of the lead edge of the separator sheet as the shuttle 82 moves toward the chute 86. A drive 178 rotates the rollers 174 in opposite directions. The shuttle 82 preferably presents the lead edge of the separator sheet so that the drive rollers 174 catch the sheet cleanly and introduce the sheet into a pair of opposed channels 182 that extend into the chute 86. The end of the chute 86 (the left end in FIG. 3) is defined by a generally horizontal plate 183 including an upwardly turned lip 184 against which the sheet eventually rests in an indexed position. The first stage handler 70 also includes apparatus 186 for squaring the sheet as the sheet moves down the chute 86.

The indexer 90 receives the sheet as it passes through the chute 86 and assures a precise positioning of the lead edge of the sheet at an indexed position at the end of the chute 86. More particularly, and with reference to FIG. 3, the indexer includes a drive wheel 190 which is constantly driven and which has a relatively small circumference, an idler wheel 194 associated with the drive wheel 190, and an apparatus 196 for selectively pinching the separator sheet between the drive wheel 190 and the idler wheel 194 to selectively advance the sheet incremental distances forward along the chute 86 toward the lip 184. The pinching apparatus 196 includes an actuator 202 which is operable to pivot the drive wheel 190 about a pivot 206 into and out of engagement with the separator sheet located between the drive wheel 190 and the idler wheel 94.

The first stage handler 70 also includes means 210 for providing a control signal to the actuator 202 indicating that the leading edge of the separator sheet has reached the lip 184 or the end 214 of the chute 86. More particularly, the signal producing means 210 includes three optical sensors 218 (one is shown in FIG. 3) located immediately adjacent the lip 184 at the end 214 of the chute 86. The sensors 218 provide a control signal for retracting the actuator 202 when the lead edge of the sheet advances over the sensors 218. This action of the actuator 202 disengages the drive wheel 190 and allows the sheet to remain in the sensed indexed position against the lip 184. Until the sensors 218 are occluded by the lead edge of the sheet, the indexer 90 advances the sheet incrementally with the drive wheel 190, toward the end 214 of the chute 86. When the indexer 90 advances the separator sheet to the index position, the separator sheet is subsequently permitted to remain in the indexed position until the second stage handler 74 indexes across the main hoist 26 to pick up the separator sheet in the manner discussed immediately below.

It should be noted that the indexer 90 may be unnecessary with a relatively heavy sheet, because the weight of the sheet will often cause the sheet to slide down the chute to the indexed position against the lip 184, at which time the sensors 218 will indicate that the sheet is in position and allow the second stage handler 74 to pick up the indexed sheet. If the weight of the sheet is insufficient to cause the sheet to slide down the chute to the indexed position against the lip 184, the indexer will move the sheet down the chute 86 as described above. It may be desirable to provide means such as an air bed to help relatively light sheets move down the chute 86. To hold the sheet down while the second stage handler 74 is removing the sheet from the first stage handler 70, the first stage handler also includes a pivotable plate 220 that is located above a sheet at the end of the chute 86 and that pivots upwardly to allow the sheet to be removed from the end of the chute 86. The plate 220 has therein five cut-outs 222, the reason for which is explained below.

Figure 6:
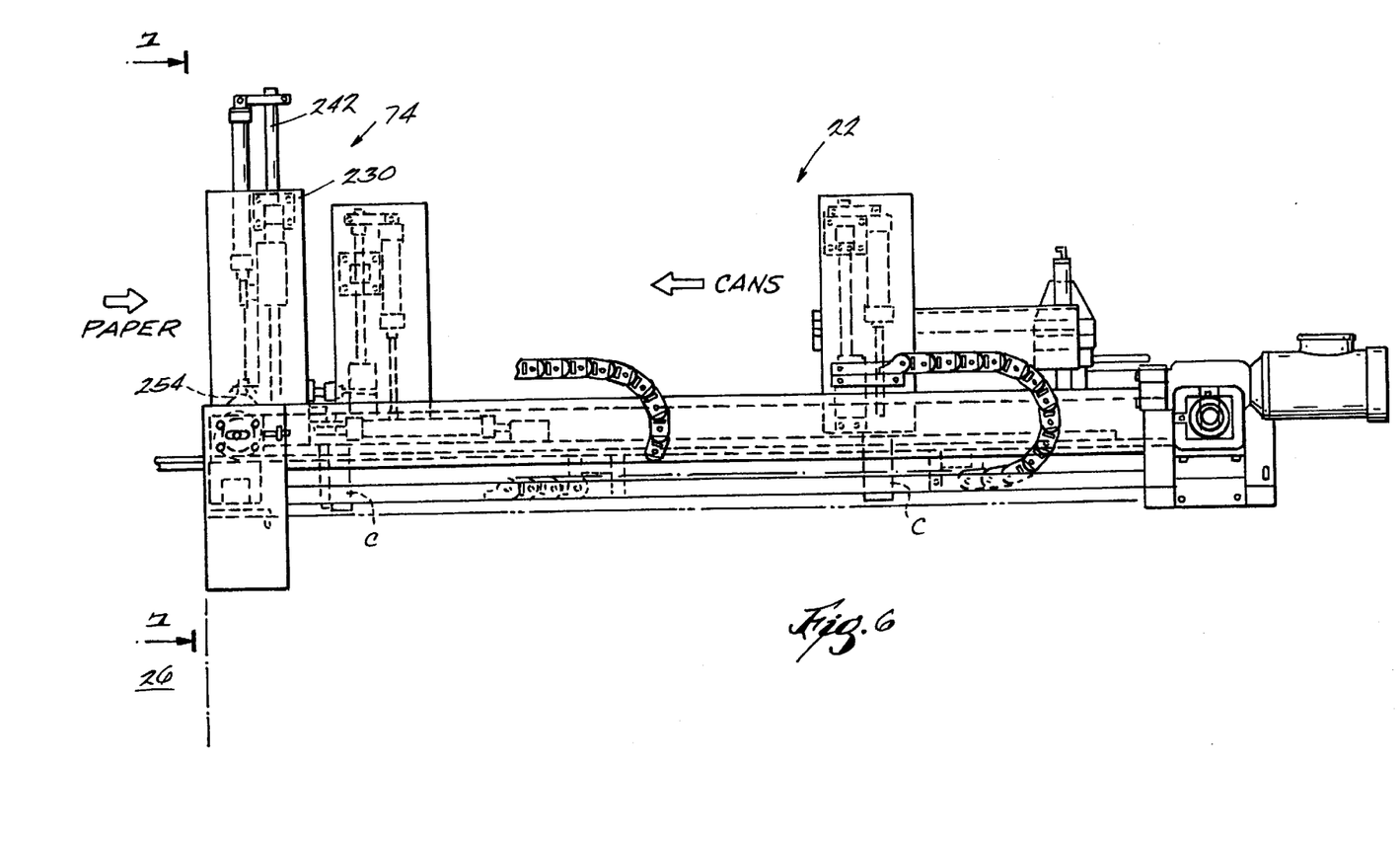
FIG. 6 is an enlarged side elevational view of another portion of the palletizer assembly, but with containers being palletized moving from right to left.
Figure 7:
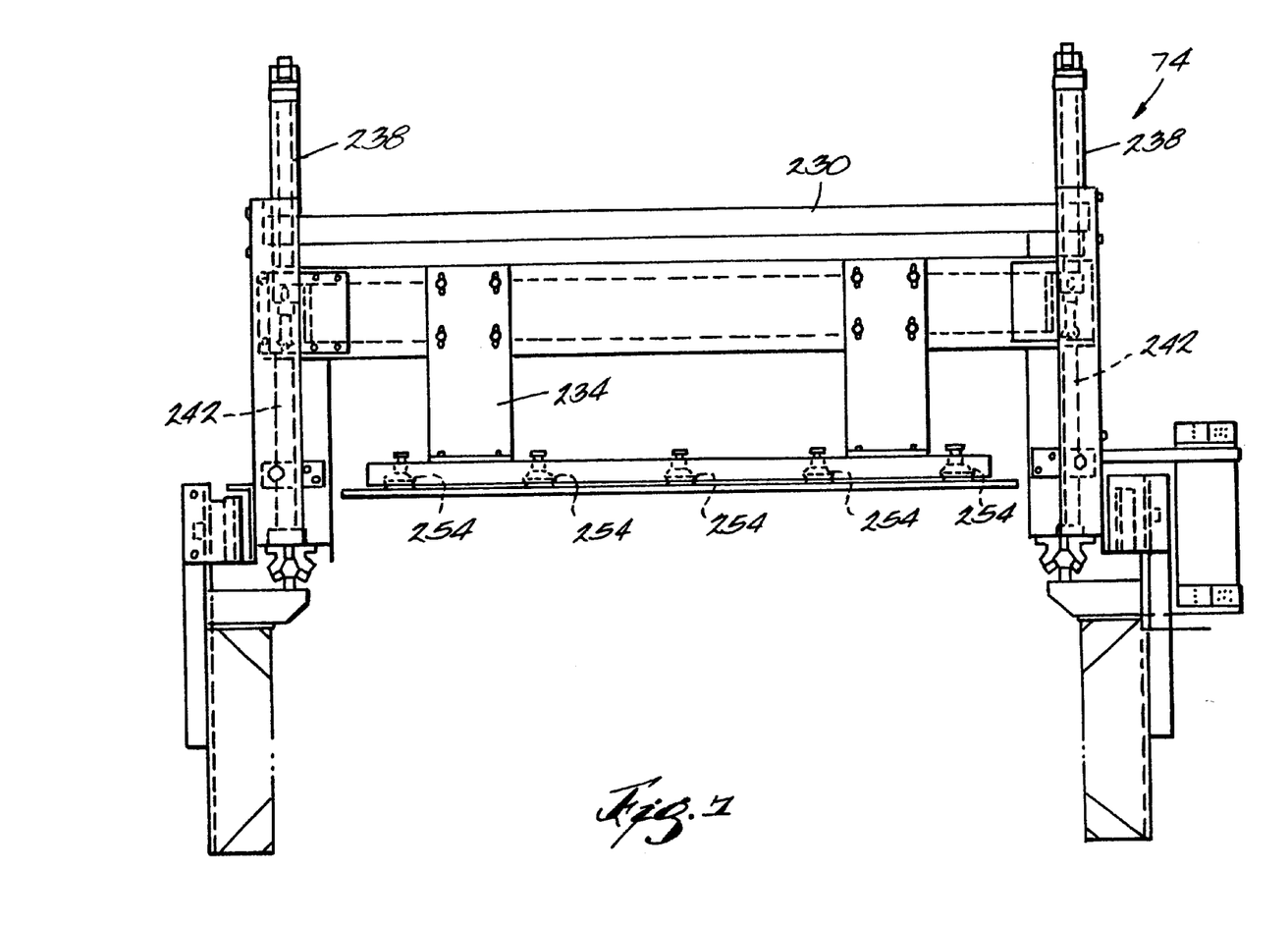
FIG. 7 is view taken generally along line 7—7 in FIG. 6.
Figure 8:
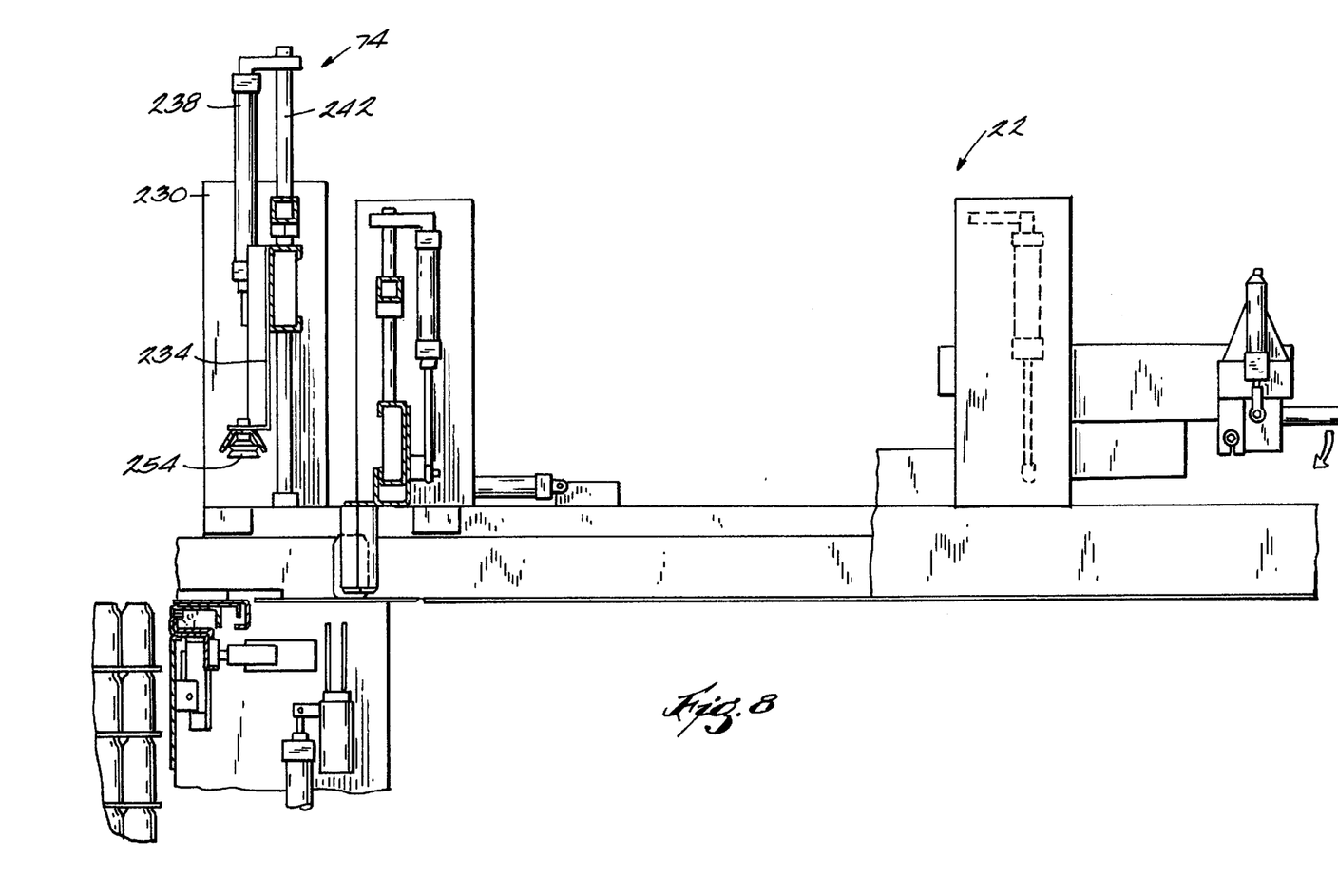
FIG. 8 is a view similar to FIG. 6 with some components removed for clarification and with some additional components shown.

The second stage separator sheet handler 74 operates in response to receipt of the control signal from the sensors 218 indicating that the sheet is in the indexed position. The second stage handler 74 includes (see FIGS. 6–8) a shuttle frame 230 fixed to the sweep apparatus 22 adjacent the main hoist 26. The shuttle frame 230 moves reciprocally with the sweep apparatus 22 between a first, extreme position (not shown) wherein the shuttle frame 230 is located over the main hoist 26 and over the lead edge of a separator sheet in the index position on the first stage handler 70, and a second extreme position (FIGS. 1, 2, 6 and 8) wherein the shuttle frame 230 is not above the main hoist 26 (to the left of the main hoist 26 in FIGS. 1 and 2 and to the right of the hoist in FIGS. 6 and 8).

The second stage shuttle frame 230 supports a subframe 234 that is moveable by actuators 238 between a lowered position (not shown) and a raised position (FIGS. 7 and 8) along guides 242 located at opposite ends of the shuttle frame 230 and the subframe 234. The second stage shuttle frame 230 also includes a plurality of suction assemblies which are located across the width of the subframe 234 and which include respective suction cups 254 for engaging the lead edge of the separator sheet in a manner similar to that of the first shuttle 82. Each of the suction cups 254 is selectively communicable to a vacuum or source of low pressure (not shown). In the illustrated construction, there are five suction cups 254, with each suction cup 254 being aligned with a respective one of the cut-outs 222 in the plate 220. The suction cups 254 move upward and downward with the subframe 234 so that, when the shuttle frame 230 is in its first position wherein the shuttle frame 230 is located over the main hoist 26 and over the lead edge of a separator sheet in the index position on the first stage handler 70, the suction cups 254 move down through the cut-outs 222 to engage the sheet, and then, as the shuttle frame 230 returns to its second position, the suction cups 254 drag the sheet from the chute 86 over the tier of objects supported in the main hoist 26. The suction cups 254 release the separator sheet in a precise location because the first stage handler 70 assures that the separator sheet is precisely located when the second stage handler 74 picks up the sheet.

The second stage handler 74 and the sweep apparatus 22 assure that objects being swept onto a separator sheet on a pallet on the main hoist 26 (the sheet just placed by the second stage handler 74) have a stable surface to move onto, and assure that the separator sheet located on the pallet on the main hoist 26 is not moved out of position or fouled with the main hoist 26 during movement of objects onto the sheet.

Figure 9:
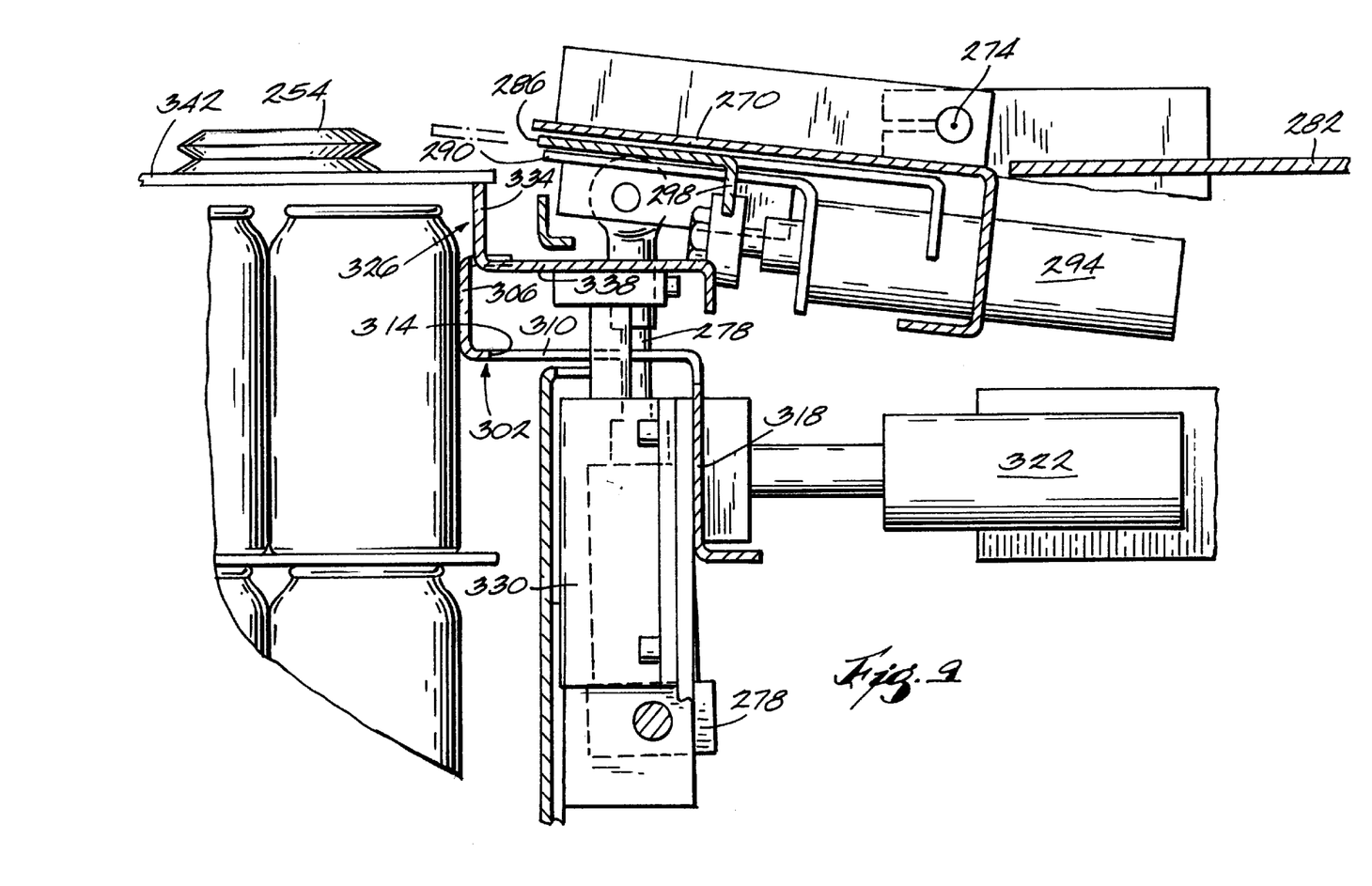
FIG. 9 is an enlarged portion of FIG. 8 showing the tilt plate in its raised position and a separator sheet being placed on top of a tier of containers on a pallet.
Figure 10:
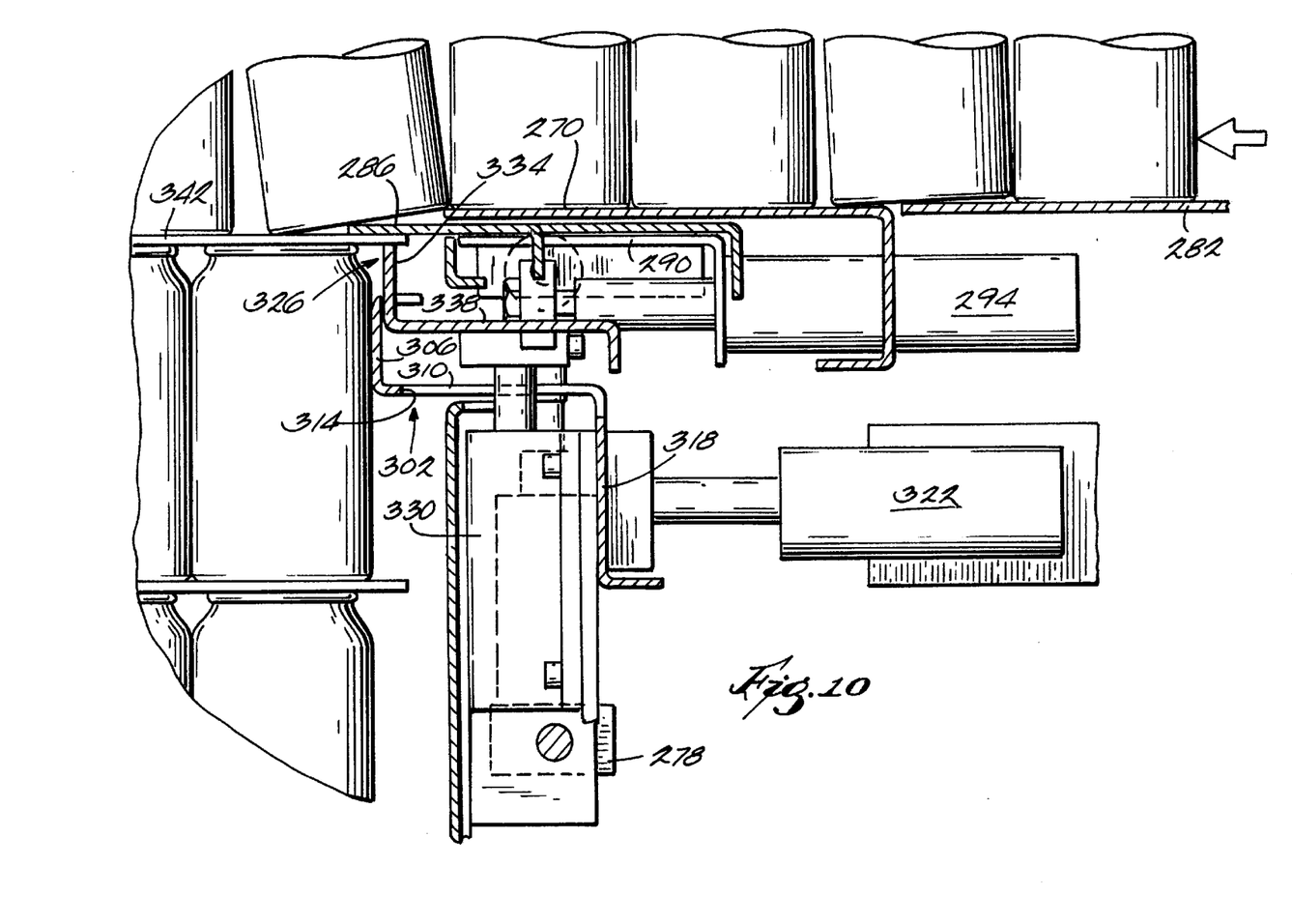
FIG. 10 is a view similar to FIG. 9 showing the tilt plate in its lowered position with the tongue extended to grip the separator sheet and to provide a bridge for containers being swept onto the separator sheet.
Figure 11:
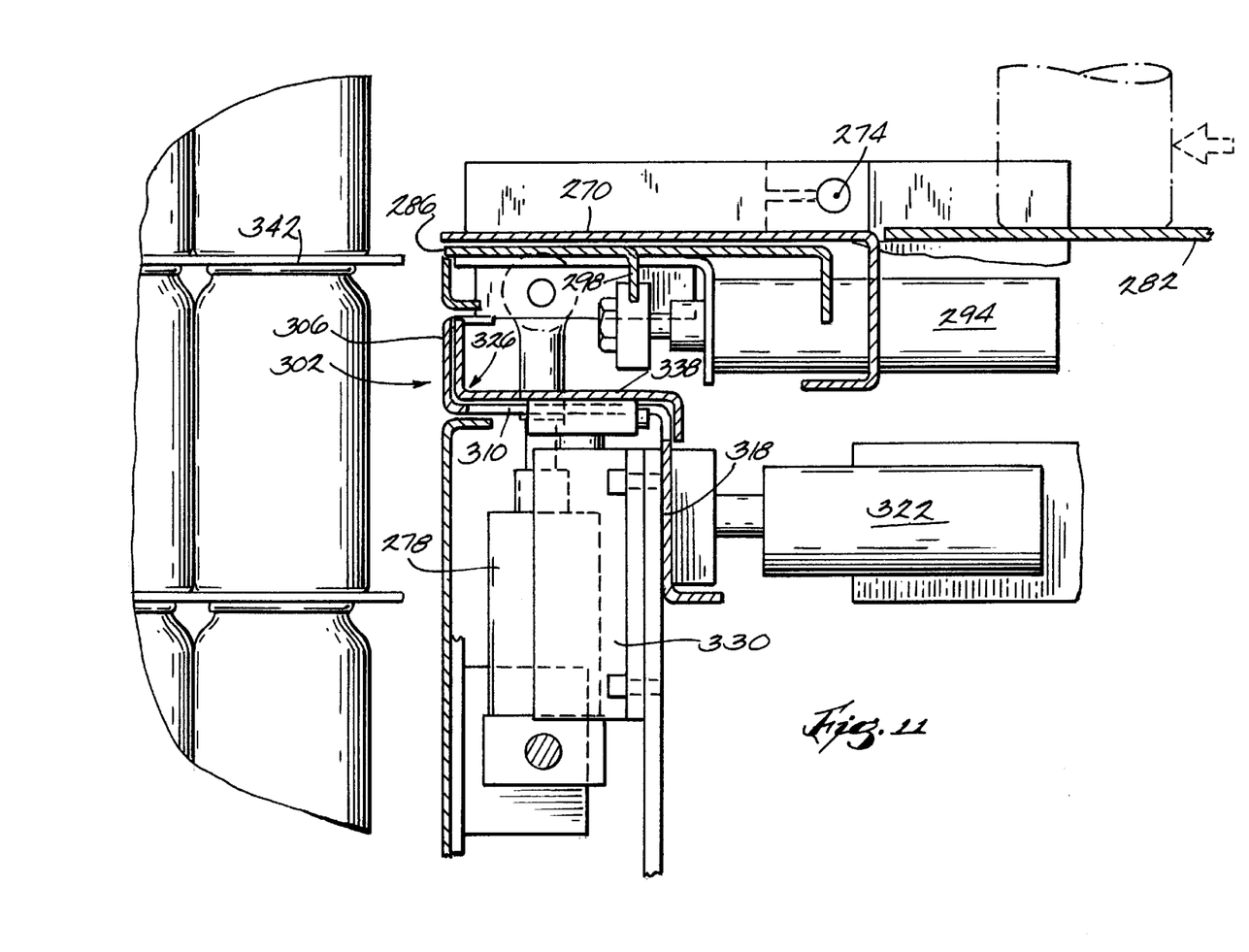
FIG. 11 is a view similar to FIG. 9 showing the tilt plate in its lowered position and with the tongue retracted to allow the main hoist to lower the pallet so that another separator sheet can be placed on top of the previously placed tier of containers.

More particularly, and with reference to FIGS. 9 through 11, the second stage handler 74 includes a tilt plate 270 pivotable about an axis 274 between a raised position (FIG. 9) and a lowered position (FIGS. 10 and 11). The tilt plate 270 is pivoted by a pair of cylinder/piston assemblies 278 (only one is shown). When in its lowered position, the tilt plate 270 is generally horizontal and cooperates with a dead plate 282 to provide a substantially continuous surface across which objects are swept onto separator sheet on a pallet on the main hoist 26. A tongue 286 is supported between the tilt plate 270 and a lower guide 290 and is movable relative to the tilt plate 270 between an extended position (shown in phantom in FIG. 9 and in solid lines in FIG. 10) and a retracted position (shown in solid lines in FIGS. 9 and 11). The tongue 286 is moved by a pair of cylinder/piston assemblies 294 (only one is shown) that pivot with the tilt plate 270. Specifically, the tongue 286 includes downward projections 298 that are engaged by the assemblies 294 for moving the tongue 286.

An object squarer 302 is movable between an extended position (FIGS. 9 and 10) and a retracted position (FIG. 11). The squarer 302 includes an outer vertical portion 306 that engages and squares objects or containers on the main hoist 26. The squarer 302 also includes a horizontal portion 310 that extends inward from the lower end of the outer vertical portion 306. The horizontal portion 310 has therein an opening 314. The squarer 302 also includes an inner vertical portion 318 that extends downward from the inner end of the horizontal portion 310. The squarer 302 is moved by a pair of cylinder/piston assemblies 322 (only one is shown) that engage the inner vertical portion 318 of the squarer 302.

A gripper 326 is mounted on the squarer 302 for vertical movement between an upper position (FIG. 9) and a lower position (FIG. 11). The gripper 326 is moved by a pair of cylinder/piston assemblies 330 (only one is shown) that extend through the opening 314 in the squarer 302 and that are fixed to the inner vertical portion 318 of the squarer 302 such that the assemblies 330 and the gripper 326 move horizontally with the squarer 302. The gripper 326 includes a vertical portion 334 that extends above the squarer 302 when the gripper 326 is in its upper position, and the gripper 326 also includes a horizontal portion 338 that is engaged by the assemblies 330.

After a tier of objects has been swept onto a pallet on the main hoist 26 and the hoist has lowered the pallet to a level so that the objects in the previously placed tier (so labeled in FIG. 9) are just below the dead plate 282, the squarer 302 is extended to square the objects in the previously placed tier, the tilt plate 270 is moved to its raised position, and the gripper 326 is moved to its upper position. This is illustrated in FIG. 9. The second stage handler 74 then places the next separator sheet (identified by reference numeral 342 in FIGS. 9 through 11) in its precise location above the previously placed tier, with the leading edge of the sheet 342 resting on the upper end of the vertical portion 334 of the gripper 326. The suction cups 254 of the second stage handler 74 then release the sheet 342. Next, as shown in FIG. 10, the tongue 286 is extended and the tilt plate 270 is moved to its lowered position. Lowering of the tilt plate 270 with the tongue 286 extended causes the edge of the sheet 342 to be captured between the underside of the tongue 286 and the upper end of the gripper 326. It should be noted that the gripper 326 moves downward somewhat as the tilt plate 270 is lowered. This allows the tilt plate 270 to move completely to its lowered position while keeping the sheet 342 captured between the tongue 286 and the gripper 326.

Thereafter, as shown in FIG. 10, the sweep apparatus 22 sweeps the next tier of objects (so labeled in FIG. 10) over the dead plate 282, the tilt plate 270 and the tongue 286 and onto the separator sheet 342. During this movement of the objects, the gripping of the sheet by the gripper 326 and the tongue 286 prevents the sheet from moving out of position (to the left in FIG. 10) due to the movement of the objects across the sheet.

After the next tier of objects has been swept onto the sheet 342, the gripper 326 is lowered and the tongue 286 and the squarer 302 are retracted, as shown in FIG. 11, so that the pallet can again be lowered to receive another separator sheet (not shown) and another tier of objects (shown in phantom in FIG. 11).

What is claimed is:

1. A palletizer assembly comprising
   (a) a conveyor,
   (b) a pattern-making apparatus for arranging objects received from the conveyor into a pattern,
   (c) a main hoist for supporting a pallet in position to receive a layer of objects,
   (d) a sweep apparatus for moving a discrete number of objects from the pattern-making apparatus into a layer of objects on the pallet, and
   (e) a separator sheet handler assembly for delivering separator sheets to the main hoist for separating layers of objects on the pallet, the separator sheet handler assembly including
      (1) a first stage handler including
         (A) a chute having an end defined by a generally horizontal plate including an upwardly turned lip,
         (B) a first shuttle for moving a single separator sheet from a stack of separator sheets into the chute, the first shuttle including a subframe that extends across the width of the stack of separator sheets and that is reciprocated horizontally, the first shuttle also including a plurality of suction assemblies located at various positions across the width of the subframe so that two end assemblies are positioned to attach to the lead edge of the uppermost separator sheet and near a corner of the uppermost sheet, each suction assembly including a suction cup movable from a lower position wherein the suction cup engages the uppermost separator sheet, to a raised position wherein the uppermost separator sheet can be fed into the chute, and a pair of bend-back actuators that are operable to move the corners of the uppermost separator sheet inwardly in order to bend the sheet and to shear away the next lowest separator sheet, each bend-back actuator including a cylinder/piston assembly operable to move the associated suction assembly so as to move the corners of the uppermost sheet inwardly, the first shuttle being operable so that the first shuttle is moved into an extended position over the stack of separator sheets with the suction assemblies raised, the suction cups are then lowered into contact with the sheet to be removed from the stack, a vacuum is applied through the suction cups to the sheet, and the bend-back actuators move to bend back the corners of the uppermost sheet,
         (C) a drive for moving the separator sheet held by the first shuttle into the chute, the drive including a pair of driven rollers, the rollers being closely spaced together and engaging the upper and lower surfaces of the lead edge of the separator sheet as the first shuttle moves toward the chute,
         (D) an indexer for precisely locating the leading edge of the sheet in the chute, the indexer receiving the sheet as the sheet passes through the chute and assuring a precise positioning of the lead edge of the sheet at an indexed position at the end of the chute, the indexer including a drive wheel which is constantly driven and which has a relatively small circumference, an idler wheel associated with the drive wheel, and an apparatus for selectively pinching the separator sheet between the drive wheel and the idler wheel to selectively advance the sheet incremental distances along the chute toward the lip, the pinching apparatus including an actuator which is operable in response to control signals to pivot the drive wheel about a pivot into and out of engagement with the separator sheet located between the drive wheel and the idler wheel, and
         (D) a sensor for providing a control signal to the actuator indicating that the leading edge of the separator sheet has reached the lip, the sensor being located immediately adjacent the lip to provide a control signal for retracting the actuator when the lead edge of the sheet advances over the sensor, thereby disengaging the drive wheel and allowing the sheet to remain in a sensed indexed position against the lip, and
      (2) a second stage separator sheet handler including
         (A) a second shuttle for moving the sheet from the chute into position in the main hoist and over a layer of objects supported by the pallet, the second shuttle including a shuttle frame fixed to the sweep apparatus, the shuttle frame moving reciprocally with the sweep apparatus between a first, extreme position wherein the shuttle frame is located over the main hoist and over the lead edge of the separator sheet in the indexed position, and a second extreme position wherein the shuttle frame is not above the main hoist, (B) a subframe that is supported by the shuttle frame and that is movable by actuators between a lowered position and a raised position, (C) a plurality of second stage suction assemblies which are located across the width of the subframe and which include respective second stage suction cups for engaging the lead edge of the separator sheet, the second stage suction cups being movable upward and downward with the subframe so that, when the shuttle frame is in the first position, the second stage suction cups move down to engage the sheet, and then, as the shuttle frame returns to the second position, the second stage suction cups drag the sheet from the chute over the layer of objects on the pallet and release the separator sheet in a precise location, (D) a tilt plate pivotable between a raised position, and a lowered position wherein the tilt plate is generally horizontal and provides a surface across which objects are swept onto the separator sheet on the pallet, (E) a tongue movable relative to the tilt plate between an extended position and a retracted position, (F) an object squarer movable between an extended position and a retracted position, the squarer including a vertical portion that engages and squares objects on the pallet, and (G) a gripper mounted on the squarer for vertical movement between an upper position and a lower position such that the gripper moves horizontally with the squarer, the gripper including a portion that extends above the squarer when the gripper is in the upper position, such that, after a layer of objects has been swept onto the pallet and the hoist has lowered the pallet, the squarer is extended to square the objects in the previously placed layer, the tilt plate is moved to the raised position, the gripper is moved to the upper position, the second stage handler then places a separator sheet in the precise location above the previously placed layer, with the leading edge of the sheet resting on the gripper, the suction cups of the second stage handler then release the sheet, the tongue is extended and the tilt plate is moved to the lowered position, lowering of the tilt plate with the tongue extended causing the edge of the sheet to be captured between the underside of the tongue and the gripper, the sweep apparatus sweeps the next layer of objects over the tilt plate and the tongue and onto the separator sheet, the gripping of the sheet by the gripper and the tongue preventing the sheet from moving out of position due to the movement of the objects across the sheet, and the gripper is lowered and the tongue and the squarer are retracted, so that the pallet can again be lowered to receive another separator sheet and another layer of objects.

2. A palletizer assembly comprising a conveyor, a pattern-making apparatus for arranging objects received from the conveyor into a pattern, a main hoist for supporting a pallet in position to receive a layer of objects a sweep apparatus for moving a discrete number of objects from the pattern-making apparatus into a layer of objects on the pallet, and a separator sheet handler assembly for delivering separator sheets to the main hoist for separating layers of objects on the pallet, the separator sheet handler assembly including a first stage handler including a chute, a first shuttle for moving a single separator sheet from a stack of separator sheets into the chute, and a sensor for providing a control signal when the lead edge of the sheet reaches an indexed position in the chute, and a second stage separator sheet handler including a second shuttle for moving the sheet from the indexed position in the chute into position in the main hoist and over a layer of objects supported by the pallet.

3. An assembly as set forth in claim 2 wherein the chute has an end, and wherein the sensor provides the control signal when the lead edge of the sheet is at the end of the chute.

4. An assembly as set forth in claim 3 wherein the end of the chute is defined by a lip, and wherein the sensor is immediately adjacent the lip and provides the control signal when the lead edge of the sheet is at the lip.

5. An assembly as set forth in claim 2 wherein the first stage handler also includes an indexer for precisely locating the leading edge of the sheet in the chute, the indexer receiving the sheet as the sheet passes through the chute and assuring a precise positioning of the lead edge of the sheet at the indexed position, the indexer including a drive wheel which is constantly driven and which has a relatively small circumference, an idler wheel associated with the drive wheel, and an apparatus for selectively pinching the separator sheet between the drive wheel and the idler wheel to selectively advance the sheet incremental distances along the chute toward the lip, the pinching apparatus including an actuator which is operable in response to control signals to pivot the drive wheel about a pivot into and out of engagement with the separator sheet located between the drive wheel and the idler wheel, and wherein the sensor provides the control signal to the actuator to retract the actuator, thereby disengaging the drive wheel and allowing the sheet to remain in the indexed position.

6. An assembly as set forth in claim 2 wherein the second shuttle moves the sheet from the indexed position in the chute into position in the main hoist in response to receipt of the control signal.

7. A palletizer assembly comprising a main hoist for supporting a pallet in position to receive a layer of objects, a sweep apparatus for moving a discrete number of objects into a layer of objects on the pallet, a separator sheet handler assembly for delivering separator sheets to the main hoist for separating layers of objects on the pallet, a tilt plate pivotable to a raised position, and a lowered position wherein the tilt plate is generally horizontal and provides a surface across which objects are swept by the sweep apparatus onto a separator sheet on the pallet, a tongue movable relative to the tilt plate between an extended position and a retracted position, and a gripper supported for vertical movement between an upper position and a lower position, such that, after a layer of objects has been swept onto the pallet, the hoist has lowered the pallet, the tilt plate is moved to the raised position, and a separator sheet has been placed above the previously placed layer, the tongue is extended and the tilt plate is moved to the lowered position, lowering of the tilt plate with the tongue extended causing the edge of the sheet to be captured between the underside of the tongue and the gripper, the gripping of the sheet by the gripper and the tongue preventing the sheet from moving out of position due to the movement of the objects across the sheet.

8. An assembly as set forth in claim 7 wherein the gripper is moved to the upper position before the separator sheet is placed above the previously placed layer.

9. An assembly as set forth in claim 7 and further comprising an object squarer movable between an extended position and a retracted position, the squarer including a vertical portion that engages and squares objects on the main hoist, and wherein the gripper is mounted on the squarer such that the gripper moves horizontally with the squarer, the gripper including a portion that extends above the squarer when the gripper is in the upper position, such that, before the separator sheet is placed above the previously placed layer, the squarer is extended to square the objects in the previously placed layer, and the gripper is moved to the upper position.

10. A method for removing the uppermost separator sheet from a vertical stack of a plurality of separator sheets, each of the plurality of separator sheets having at least two corners and an edge extending between the corners, the method comprising the acts of:
   (a) holding the uppermost sheet at first and second locations adjacent the edge of the uppermost sheet and near the two corners of the uppermost sheet,
   (b) holding the uppermost sheet at a third location,
   (c) vertically lifting the uppermost sheet at each of the first, second and third locations away from the stack of separator sheets; and
   (d) subsequently moving one of the first and second locations of the uppermost sheet in a first direction and moving the other of the first and second locations of the uppermost sheet in a second direction at an angle relative to the first direction, the first and second directions lying in a common plane.

11. A method as set forth in claim 10 wherein step (c) includes moving the two corners of the sheet inwardly and in the direction away from the edge of the sheet.

12. A method as set forth in claim 10 wherein steps (a) and (b) include using at least three suction assemblies to engage the upper surface of the uppermost sheet, and wherein step (c) includes moving two of the suction assemblies.

13. A method for palletizing objects, the method comprising the steps of (a) supporting a pallet in a position to receive a layer of objects,
   (b) placing a separator sheet on the pallet for separating layers of objects on the pallet, the sheet having upper and lower surfaces,
   (c) providing a tilt plate adjacent to the position of the pallet, said tilt plate being movable to a raised position, and a lowered position wherein the tilt plate is generally horizontal and provides a surface across which objects are swept onto the separator sheet,
   (d) after step (b), moving the tilt plate to the lowered position and sweeping a layer of objects onto the separator sheet on the pallet, and
   (e) while sweeping the layer of objects onto the separator sheet, gripping the upper and lower surfaces of the sheet to prevent the sheet from moving out of position due to the movement of the objects across the sheet.

14. A method as set forth in claim 13 wherein steps (c)–(e) include providing a tongue movable relative to the tilt plate between an extended position and a retracted position, providing a gripper, and, after step (b), extending the tongue and moving the tilt plate to the lowered position so that the sheet is captured between the underside of the tongue and the gripper.

15. A method as set forth in claim 14 wherein the gripper is supported for vertical movement between an upper position and a lower position, and further comprising the steps of moving the tilt plate to the raised position and moving the gripper to the upper position before step (b).

16. A method for removing the uppermost separator sheet from a vertical stack of a plurality of separator sheets, each of the separator sheets having at least one edge and at least one corner, the method comprising the acts of:
   (a) holding the uppermost sheet at a first location adjacent an edge of the uppermost sheet and at a second location adjacent a corner of the uppermost sheet,
   (b) holding the uppermost sheet at a third location spaced from the first location and the second location, and
   (c) moving the first, second and third locations of the uppermost sheet vertically, and
   (d) moving the first and second locations toward the third location, the first, second and third locations lying in a common plane.

\* \* \* \* \*